(12) United States Patent
Wardrop et al.

(10) Patent No.: US 11,933,505 B2
(45) Date of Patent: Mar. 19, 2024

(54) INTEGRATED HEAT PUMP SYSTEM

(71) Applicant: Hybrid Energies Alternative Technologies Inc., West Vancouver (CA)

(72) Inventors: Walter Wardrop, West Vancouver (CA); Nicholas Barber, Mission (CA)

(73) Assignee: Hybrid Energies Alternative Technologies, Inc. (CA)

( * ) Notice: Subject to any disclaimer, the term of this patent is extended or adjusted under 35 U.S.C. 154(b) by 0 days.

(21) Appl. No.: 18/154,744

(22) Filed: Jan. 13, 2023

(65) Prior Publication Data
US 2023/0228448 A1    Jul. 20, 2023

(51) Int. Cl.
| | | |
|---|---|---|
| F24F 1/029 | (2019.01) | |
| F24F 1/022 | (2019.01) | |
| F24F 1/031 | (2019.01) | |
| F24F 5/00 | (2006.01) | |
| F24F 12/00 | (2006.01) | |
| F24F 110/72 | (2018.01) | |

(52) U.S. Cl.
CPC .............. *F24F 1/029* (2019.02); *F24F 1/022* (2013.01); *F24F 1/031* (2019.02); *F24F 5/0096* (2013.01); *F24F 12/006* (2013.01); *F24D 2200/10* (2013.01); *F24F 2110/72* (2018.01); *F24F 2221/17* (2013.01)

(58) Field of Classification Search
CPC .......... F24F 1/022; F24F 1/031; F24F 5/0096; F24F 12/003; F24F 12/006
See application file for complete search history.

(56) References Cited

U.S. PATENT DOCUMENTS

| | | | | |
|---|---|---|---|---|
| 3,308,634 | A * | 3/1967 | Smith ..................... | F24F 13/20 62/263 |
| 4,013,120 | A * | 3/1977 | Rheinheimer .......... | F24F 1/029 165/56 |
| 4,505,328 | A * | 3/1985 | Schmitt ................... | F24F 1/022 417/372 |
| 4,544,023 | A * | 10/1985 | Marciniak ............... | F24F 1/022 165/57 |
| 6,185,943 | B1 | 2/2001 | Kopko | |
| 9,080,801 | B2 * | 7/2015 | Arjomand ............... | F24F 1/027 |

(Continued)

FOREIGN PATENT DOCUMENTS

| | | |
|---|---|---|
| DE | 10107637 A1 | 9/2022 |
| GB | 2478897 A * | 9/2011 ............ F24B 1/1808 |

*Primary Examiner* — Christopher R Zerphey
(74) *Attorney, Agent, or Firm* — Baumgartner Patent Law, LLC; Marc Baumgartner

(57) ABSTRACT

An integrated heat pump energy recovery ventilator system is provided for installing in a chase of a wall, the integrated heat pump energy recovery ventilator system comprising an air intake duct; an air outlet duct; a pump in fluid communication with the air intake duct; and in order: a heat pump compressor plate; an outer insulation panel; an outer energy recovery ventilator core; a heat pump evaporator plate and an inner energy recovery ventilator core, wherein the heat pump condenser plate, the outer heat pump energy recovery ventilator core, the evaporator plate and the inner heat pump energy recovery ventilator core all include at least a first series of channels and a second series of channels, the second series of channels disposed normal to the first series of channels, each series of channels.

12 Claims, 16 Drawing Sheets

(56) References Cited

U.S. PATENT DOCUMENTS

| | | | |
|---|---|---|---|
| 10,852,028 B2 * | 12/2020 | Hirsch | F24F 12/006 |
| 11,226,110 B2 * | 1/2022 | DeMonte | F24F 13/222 |
| 11,466,872 B2 * | 10/2022 | Clark | F24F 1/027 |
| 2010/0224347 A1 * | 9/2010 | Urch | F24F 12/006 |
| | | | 165/166 |
| 2010/0287953 A1 * | 11/2010 | Urch | F28D 9/0025 |
| | | | 165/59 |
| 2012/0216558 A1 | 8/2012 | Dempsey | |
| 2018/0120035 A1 | 5/2018 | Rich | |
| 2019/0107296 A1 | 4/2019 | Clark | |
| 2019/0316807 A1 | 10/2019 | Singh | |
| 2020/0041162 A1 | 2/2020 | Conrad | |
| 2020/0182489 A1 | 6/2020 | Clark | |
| 2022/0018571 A1 * | 1/2022 | Yamaguchi | F24F 12/003 |

* cited by examiner

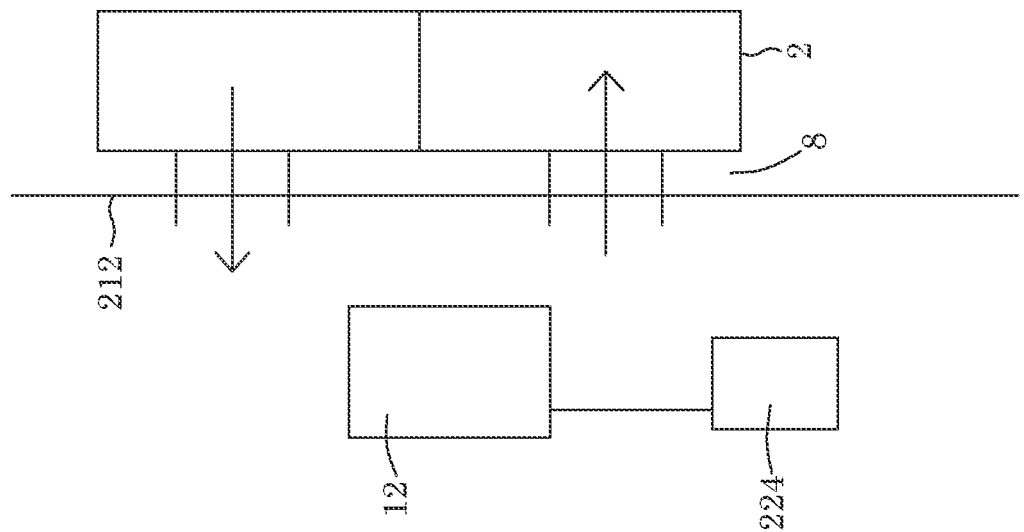

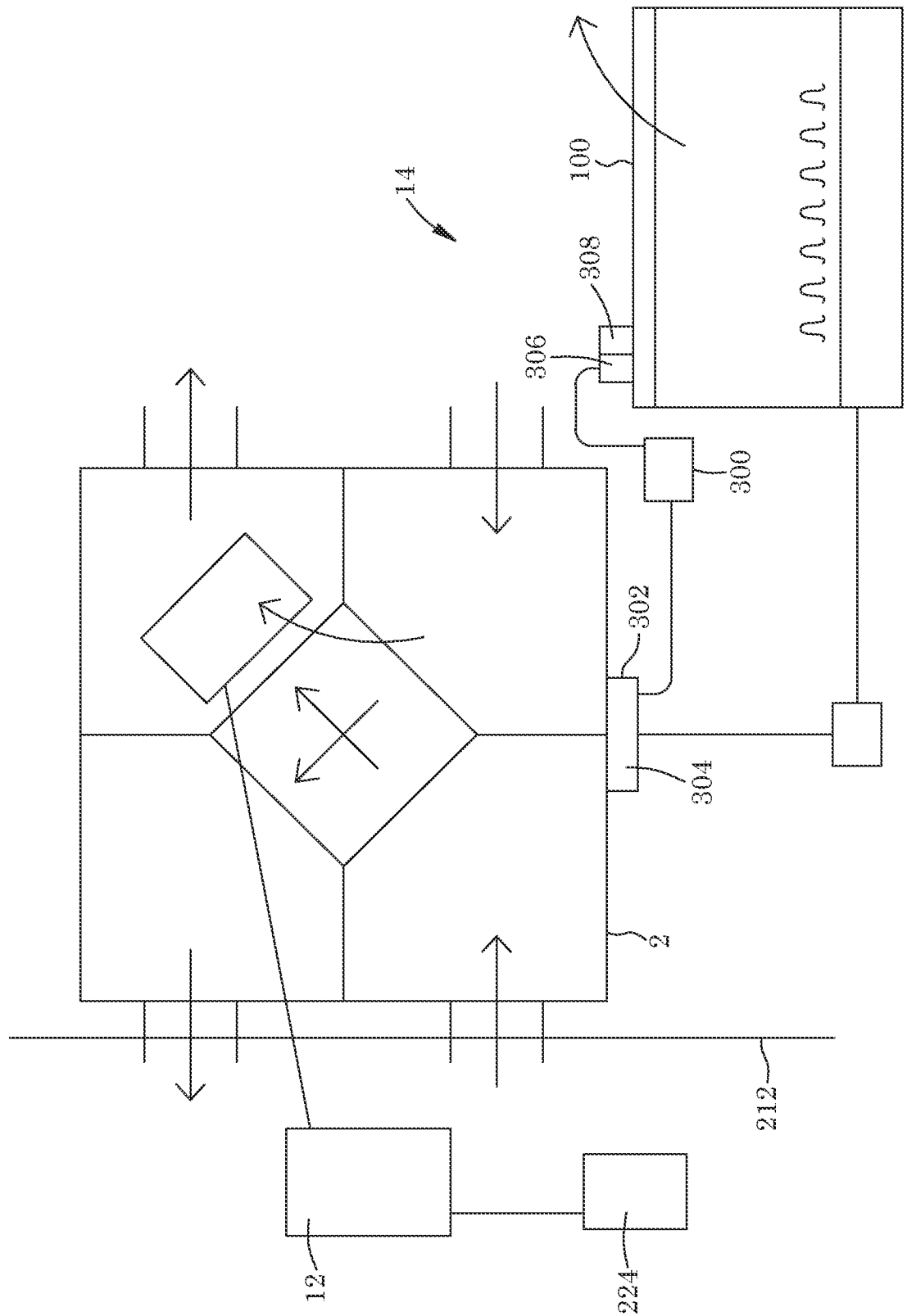

INTEGRATED HEAT PUMP SYSTEM

CROSS REFERENCE TO RELATED APPLICATIONS

This application claims priority to Canadian Patent Application Serial No. 3,145,720, filed Jan. 4, 2022, entitled INTEGRATED HEAT PUMP SYSTEM. The above-identified priority patent application is incorporated herein by reference in their entirety.

FIELD

The present technology is an integrated heat pump system that is designed to be mounted within the cavity between studs of an exterior wall or in the wall chase. More specifically it is an integrated heat pump system that is of higher efficiency, is easier to maintain and can be used in hotel rooms, condominiums and houses.

BACKGROUND

Heat pumps have been around for many years. Heat recovery ventilators (HRV) or fresh air exchangers (FEA) have also been around for years. A more recent improvement for heat recovery ventilators is energy recovery ventilators (ERV). The difference is that the ERVs can transfer the moisture between the airflows, thereby capturing the latent heat. The deficiency in these is that there is an exterior compressor condenser unit which have exposed fans which are used to draw the outside air through the compressor/condenser coil. This exposed fan results in a lot of noise for the neighbors. Another deficiency is that exterior lifting devices need to be used when servicing the exterior parts of the heat pump apparatus on tall buildings.

A more recent innovation is adding a heat pump into a normal air to air heat exchanger or HRV. There are several manufacturers of these devices. These devices have the same footprint as HRVs or FEAs and they regulate temperature throughout a house. The disadvantages are that they have a restricted airflow source. The high static pressure caused by restrictive ductwork creates a need for a powerful fan that usually is quite noisy. They require insulated venting pipes and a long length of venting pipe. There is no access to the venting pipes, are best for detached homes and large structures, must be located inside the house and have a short heat exchanger run. They also do not address the problem of only part of the heat exchanger core being actively used. Examples include United States Patent Application Publication Nos. 20200182489 and 20190107296 which disclose an HVAC system that utilizes one or more modular heat pump units installed within an outer wall or corner of a building, and one or more active registers. A central hub, which can be integrated into a modular HVAC unit, receives input from thermostats and sensors in the building and adjusts operation of the modular HVAC units and active registers to distribute conditioned air throughout the building. The system provides convenience and comfort of a traditional split HVAC system with significantly reduced installation and maintenance costs. The modular HVAC unit includes an interchangeable cartridge that contains the active components of a heat pump. Cartridges of different capacities can be installed as required, and are easily swapped out for maintenance, servicing, and replacement. A user can control the system using traditional-style thermostats and with a smart phone, tablet or computer. A cloud server provides backup services and remote access to the system.

United States Patent Application Publication No. 20200041162 discloses an HVAC system including an HRV or ERV unit, a first distribution system, and an ambient energy distribution system. The first distribution system has a first end in thermal communication with the HRV or ERV unit and a second end in thermal communication with the interior of a domicile. The ambient energy distribution system extends between first and second locations in the domicile and is isolated from fluid flow communication with the first distribution system. The ambient energy distribution system transfers heat between the first and second locations.

United States Patent Application Publication No. 20190316807 discloses a heating, ventilation, and air conditioning (HVAC) system that includes a heat pump having a housing. The HVAC system also includes an energy recovery ventilator (ERV) or heat recover ventilator (HRV) integrated with the heat pump such that an access panel to the ERV or HRV faces outwardly from the housing of the heat pump, and such that the access panel is accessible at an outer boundary of the housing.

United States Patent Application Publication No. 20180120035 discloses a high efficiency ventilation system that may include a partition configured to separate a supply air stream and a return air stream, an energy recovery ventilator, a heat recovery ventilator, a refrigerant flow controlling condensing unit, and a direct expansion coil. The refrigerant flow controlling condensing unit may be configured to send a refrigerant to the direct expansion coil and configured to receive a refrigerant from the direct expansion coil. The direct expansion coil may be disposed between the energy recovery ventilator and the heat recovery ventilator. The high efficiency ventilation system may be configured to supply ventilation air to a controlled environment at a particular temperature and a particular humidity.

United States Patent Application Publication No. 20120216558 discloses a pre-packaged air conditioning system for providing heating, cooling, ventilation and energy recovery, the system comprising: an energy recovery ventilator, condenser, condenser fan, compressor, expansion device, flow reversing valve, evaporator and evaporator fan; an inlet for providing outside air to the evaporator, the inlet for extending beyond a wall of a host structure; and an exhaust duct for exhausting air outside of the host structure, the exhaust duct for extending beyond a wall to the host structure; wherein the energy recovery ventilator, condenser, condenser fan, compressor, evaporator and evaporator fan are housed within a single envelope configured for installation inside the host structure.

U.S. Pat. No. 6,185,943 discloses a system and method for providing conditioned air to the interior space of a building includes separate dehumidification and sensible cooling functions. The separate dehumidification allows for much higher supply air temperatures, preferably within about 10 degrees Fahrenheit to about 15 degrees Fahrenheit of the air temperature of the building space. Low-velocity air distribution through a ceiling plenum or a vent into the space allows for very low fan static pressures, which greatly reduces fan energy usage compared to conventional ducted systems. The low static pressures and high supply-air temperatures allow the use of existing drop ceiling construction with little modification. Optional return air channels between an inner glazing and an outer glazing of exterior windows can virtually eliminate heating loads at the building perimeter, which virtually eliminates the need for simultaneous heating and cooling. The result is a major improvement in energy efficiency and comfort while reducing installed cost of the system.

What is needed is an improved heat pump system that includes a heat pump unit and at least one insulating layer. It would be preferable if the heat pump unit was an integrated heat pump and energy recovery ventilator. It would be preferable if the entire unit including the condenser coil and associated mechanical parts were all accessible from the inside of the building. It would be preferable if there was no need for exterior lifting devices to be used when servicing the exterior parts of the heat pump apparatus. It would be further preferable if the system could be housed in the cavity between exterior wall studs. It would be further preferable if the unit included at least one vacuum insulating panel (VIP). It would be further preferable if the evaporator and condenser coils were separated from one another by the vacuum insulating panel. It would be preferable of the condenser was for locating on the exterior of the building in situations where cooling requirements were high. It would be further preferable if there were minimal requirement for fans. It would be further preferable if the energy recovery ventilator was one or a plurality of plates with long heat exchanger paths. It would be further preferable if the system could be integrated into other heating or cooling appliances including ventless appliances.

SUMMARY

The present technology is an integrated heat pump system that includes a heat pump unit and at least one insulating layer. The heat pump unit is an integrated heat pump and energy recovery ventilator. The entire unit including the condenser coil and associated mechanical parts are all accessible from the inside of the building. This removes the need for exterior lifting devices to be used when servicing the heat pump apparatus. The system can be housed in the cavity between exterior wall studs. In one embodiment, the unit includes at least one vacuum insulating panel to improve insulation. The evaporator and condenser coils are separated from one another by a vacuum insulating panel. The condenser can be located on the exterior of the building in situations where cooling requirements are high. In some cases, heat can move between areas by pump or valve, instead of fans. The energy recovery ventilator is one or a plurality of plates with long heat exchanger paths. The system can be integrated into other heating or cooling appliances, including ventless appliances.

In one embodiment, an integrated heat pump energy recovery ventilator system is provided for installing in a chase of a wall, the integrated heat pump energy recovery ventilator system comprising:
  a heat pump which includes: an air intake duct; a pump in fluid communication with the air intake duct; a heat pump compressor plate in fluid communication with the pump; a heat pump evaporator plate; and an air outlet duct;
  an energy recovery ventilator which includes: an outer energy recovery ventilator core; and an inner energy recovery ventilator core which are disposed about the heat pump compressor plate;
  an outer insulation panel between the heat pump compressor plate and the outer energy recovery ventilator core;
  and a housing, the housing including a front and a back, the housing retaining the heat pump, the energy recovery ventilator and the outer insulation panel.

In the integrated heat pump energy recovery ventilator system, the heat pump condenser plate, the outer heat pump energy recovery ventilator core, the evaporator plate and the inner heat pump energy recovery ventilator core may all include at least a first series of channels and a second series of channels, the second series of channels disposed normal to the first series of channels, each series of channels including innermost channels which define a bore and a narrow diameter opening to the bore, outermost channels which define a bore and a wide diameter opening to the bore and channels between the innermost channels and the outermost channels that define a bore and an intermediate diameter opening to the bore.

The integrated heat pump energy recovery ventilator system may further comprise an inner insulation panel between the heat pump evaporator plate and the inner energy recovery ventilator core.

In the integrated heat pump energy recovery ventilator system the first series of channels and the second series of channels may define a curved path.

In another embodiment, a combination is provided comprising a heater for installing in the interior of a structure and an integrated heat pump energy recovery ventilator system for installing in a chase of a wall of the structure, the integrated heat pump energy recovery ventilator system in fluid communication with the heater and comprising:
  a heat pump which includes: an air intake duct; a pump in fluid communication with the air intake duct; a heat pump compressor plate in fluid communication with the pump; a heat pump evaporator plate; and an air outlet duct;
  an energy recovery ventilator which includes: an outer energy recovery ventilator core; and an inner energy recovery ventilator core which are disposed about the heat pump compressor plate;
  an outer insulation panel between the heat pump compressor plate and the outer energy recovery ventilator core;
  and a housing, the housing including a front and a back, the housing retaining the heat pump, the energy recovery ventilator and the outer insulation panel.

In the heat pump condenser plate, the outer heat pump energy recovery ventilator core, the evaporator plate and the inner heat pump energy recovery ventilator core may all include at least a first series of channels and a second series of channels, the second series of channels disposed normal to the first series of channels, each series of channels including innermost channels which define a bore and a narrow diameter opening to the bore, outermost channels which define a bore and a wide diameter opening to the bore and channels between the innermost channels and the outermost channels that define a bore and an intermediate diameter opening to the bore.

In the combination, the heater may be a gas fireplace.

In the combination, the gas fireplace may include at least one infrared element.

The combination may further comprise an air filtration system which is in fluid communication with the gas fireplace and the integrated heat pump energy recovery ventilator system.

In the combination, the heater may include an exhaust duct which exhausts into the integrated heat pump energy recovery ventilator system.

In another embodiment an installation is provided that comprises:
  an integrated heat pump energy recovery ventilator system for housing in a chase of a wall of the structure, the integrated heat pump energy recovery ventilator system comprising an air intake duct; an air outlet duct; a pump in fluid communication with the air intake duct; and in order: a heat pump compressor plate which is in fluid communication with the pump; an outer insulation panel; an outer energy recovery ventilator core; a heat pump evaporator plate and an inner energy recovery ventilator core; and a cold room, the cold room defined by the inner energy recovery core, a front, a top, a bottom and sides, the cold room including a refrigeration unit.

In the installation, the heat pump condenser plate, the outer heat pump energy recovery ventilator core, the evaporator plate and the inner heat pump energy recovery ventilator core may all include at least a first series of channels and a second series of channels, the second series of channels disposed normal to the first series of channels, each series of channels including innermost channels which define a bore and a narrow diameter opening to the bore, outermost channels which define a bore and a wide diameter opening to the bore and channels between the innermost channels and the outermost channels that define a bore and an intermediate diameter opening to the bore.

In another embodiment, a heat exchange system is provided, the heat exchange system comprising, in order: a pump; a heat pump compressor plate which is in fluid communication with the pump; an outer insulation panel; an outer energy recovery ventilator core; a heat pump evaporator plate and an inner energy recovery ventilator core, wherein the heat pump condenser plate, the outer heat pump energy recovery ventilator core, the evaporator plate and the inner heat pump energy recovery ventilator core all include at least a first series of channels and a second series of channels, the second series of channels disposed normal to the first series of channels, each series of channels including innermost channels which define a bore and a narrow diameter opening to the bore, outermost channels which define a bore and a wide diameter opening to the bore and channels between the innermost channels and the outermost channels that define a bore and an intermediate diameter opening to the bore.

In another embodiment, a combination is provided comprising a ventless heater for installing in the interior of a structure, an integrated heat pump energy recovery ventilator system for installing in a chase of a wall of the structure and a carbon monoxide control system, the carbon monoxide control system comprising a carbon monoxide detector, a ventless heater controller in wired or wireless communication with the carbon monoxide detector and an integrated heat pump energy recovery ventilator system controller in wired or wireless communication with the carbon monoxide detector, the integrated heat pump energy recovery ventilator system in fluid communication with the ventless heater and comprising:

an air intake duct; a pump in fluid communication with the air intake duct; a heat pump compressor plate in fluid communication with the pump; an outer energy recovery ventilator core; a heat pump evaporator plate; an inner energy recovery ventilator core; and an air outlet duct;

an outer insulation panel between the heat pump compressor plate and the outer energy recovery ventilator core;

and a housing, the housing including a front and a back, the housing retaining the heat pump unit and the outer insulation panel.

In the combination, the heat pump condenser plate, the outer heat pump energy recovery ventilator core, the evaporator plate and the inner heat pump energy recovery ventilator core may all include at least a first series of channels and a second series of channels, the second series of channels disposed normal to the first series of channels, each series of channels including innermost channels which define a bore and a narrow diameter opening to the bore, outermost channels which define a bore and a wide diameter opening to the bore and channels between the innermost channels and the outermost channels that define a bore and an intermediate diameter opening to the bore.

In the combination, the ventless heater may be a gas fireplace.

In the combination, the gas fireplace may include at least one infrared element.

The combination may further comprise an air filtration system which is in fluid communication with the gas fireplace and the integrated heat pump energy recovery ventilator system.

In the combination, the gas fireplace may include an exhaust duct which exhausts into the integrated heat pump energy recovery ventilator system.

In another embodiment, a combination is provided comprising a ventless heater for installing in the interior of a structure and an energy recovery ventilator for installing in a chase of a wall of the structure, the energy recovery ventilator in fluid communication with the ventless heater and comprising:

an outer energy recovery ventilator core and an inner energy recovery ventilator core;

an outer insulation panel between the outer energy recovery ventilator core and the outer energy recovery ventilator core;

and a housing, the housing including a front and a back, the housing retaining the energy recovery ventilator and the outer insulation panel.

In the combination, the ventless heater may be a gas fireplace.

In the combination, the gas fireplace may include at least one infrared element.

The combination may further comprise an air filtration system which is in fluid communication with the gas fireplace and the energy recovery ventilator.

In the combination, the gas fireplace may include an exhaust duct which exhausts into the energy recovery ventilator.

BRIEF DESCRIPTION OF THE DRAWINGS

FIG. 13 is a perspective view of an alternative embodiment of an integrated heat pump energy recovery ventilator system with components on an exterior wall.

FIG. 14 is a schematic of a ventless heater that is interlocked with an integrated heat pump energy recovery ventilator system.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1A:
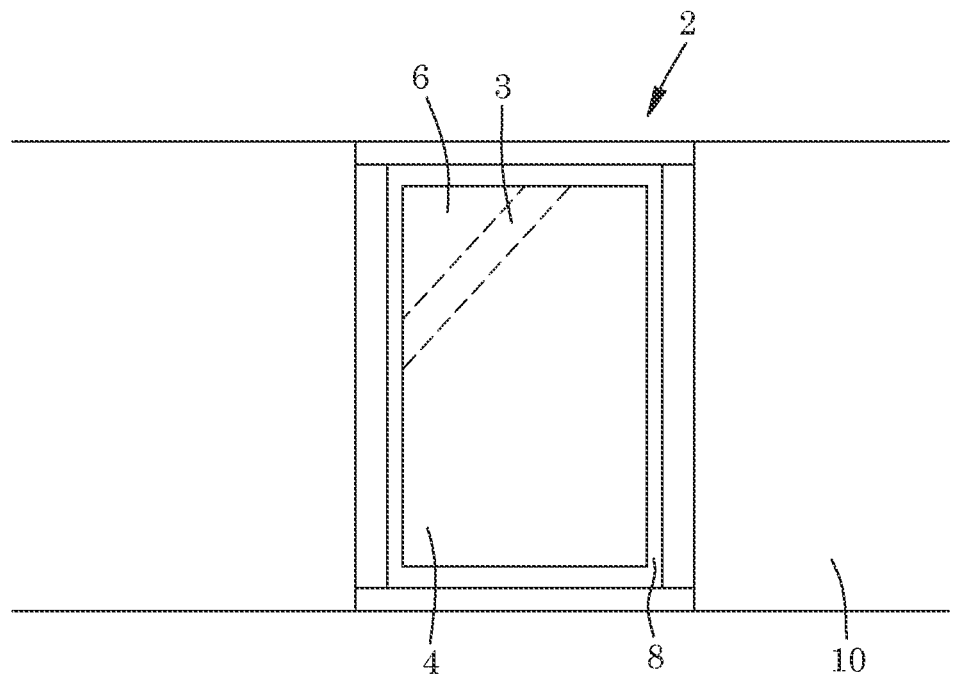
FIG. 1A is a partial cutaway face view of the integrated heat pump energy recovery ventilator system of the present technology housed in the stud cavity of an exterior wall.

An integrated heat pump energy recovery ventilator system, generally referred to as 2 is shown in FIG. 1A. It includes an energy recover ventilator 3, a heat pump unit 4 and at least one insulating layer 6. In one embodiment it is housed in the stud cavity, generally referred to as 8 in the exterior wall 10 of a building. In another embodiment it may be housed in the chase of a building.

Figure 1B:
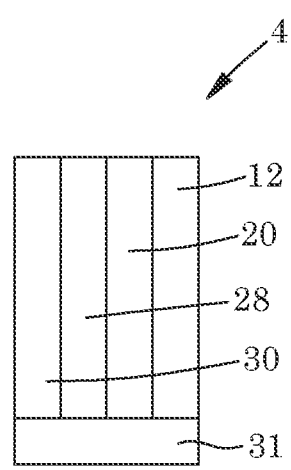
FIG. 1B is a schematic showing the heat pump unit.

As shown in FIG. 1B, the heat pump unit 4 includes the heat pump condenser plate 12, the outer energy recovery ventilator core 20, the heat pump evaporator plate 28, the inner energy recovery ventilator core 30 and the mechanical components which include a pump or compressor 31 and fans. The components are in fluid communication with each other as follows: the heat pump condenser plate 12 is in fluid communication with the outer energy recovery ventilator core 20, which is in fluid communication with the heat pump evaporator plate 28, which is in fluid communication with the inner energy recovery ventilator core 30. The pump 31 is in fluid communication with both the heat pump condenser plate 12 and the heat pump evaporator plate 28.

Figure 1C:
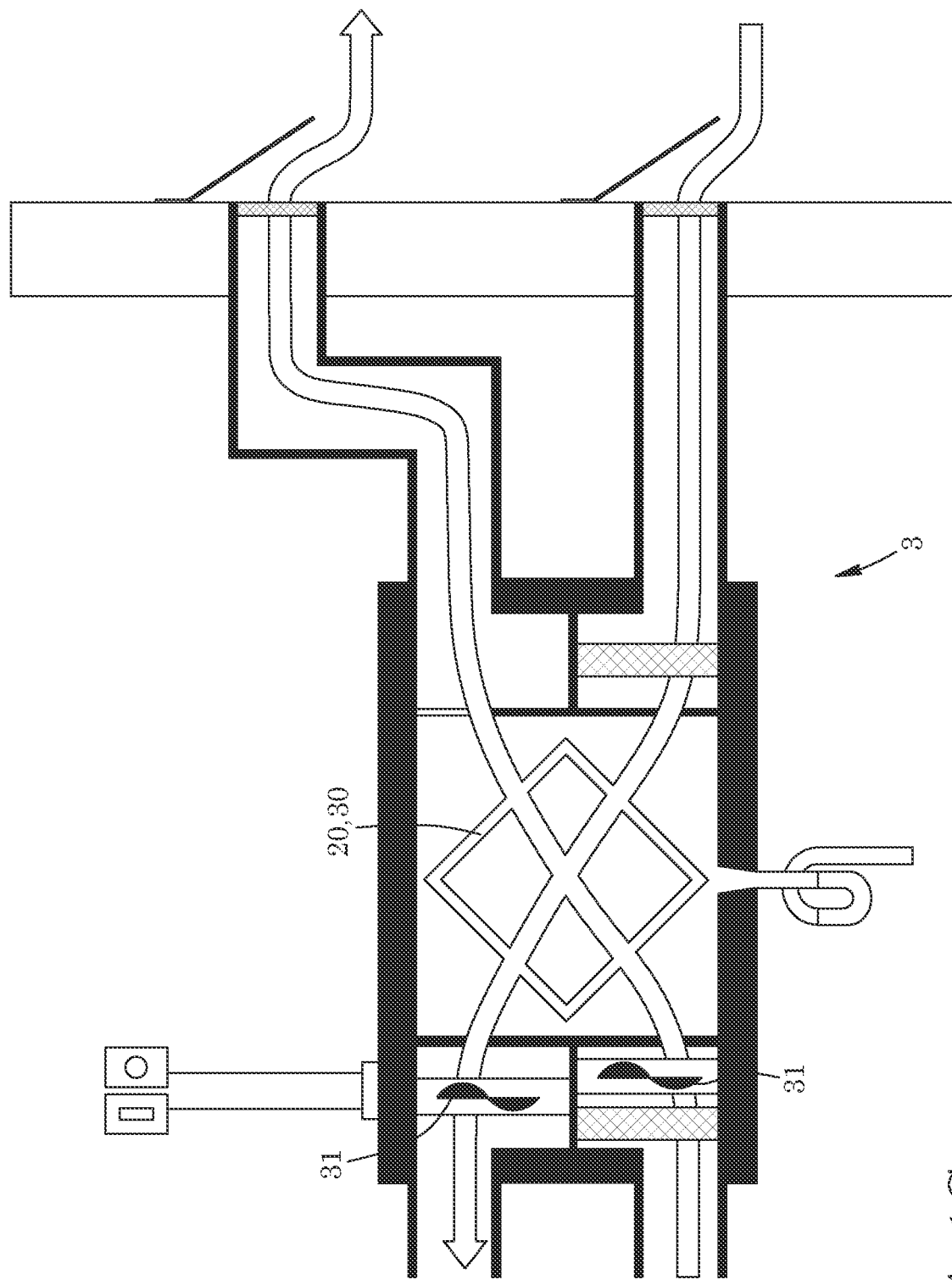
FIG. 1C is a schematic showing the energy recovery ventilation system.

As shown in FIG. 1C, the energy recovery ventilator 3 includes the outer energy recovery ventilator core 20, the inner energy recovery ventilator core 30 and fans 31. It is inline with the ducting (see FIG. 2).

Figure 2:
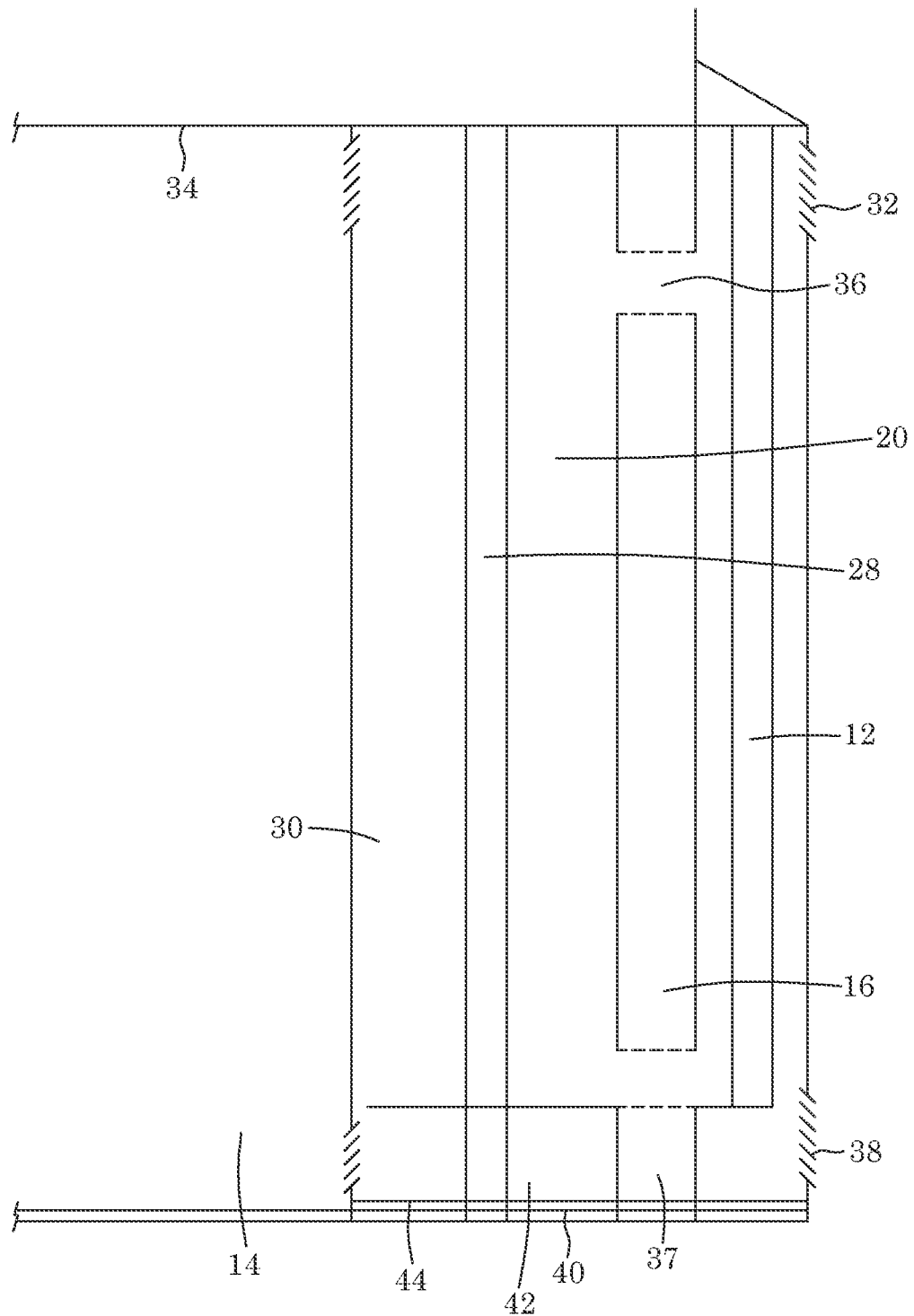
FIG. 2 is a side sectional view of the integrated heat pump energy recovery ventilator system of FIG. 1A.

As shown in FIG. 2, in one embodiment the heat pump condenser plate 12 forms the exterior layer. From the exterior to the interior, generally referred to as 14, a condenser plate insulation panel, which is preferrable a vacuum insulating panel (VIP) 16, is interior to the heat pump condenser plate 12, then an outer energy recovery ventilator core 20, which includes a stack of plates, a heat pump evaporator plate 28 and an inner energy recovery ventilator core 30. There is venting 36 through the VIP 16. An air discharge duct 32 is located proximate to the ceiling 34. An air intake duct 38 is proximate to the floor 40. The mechanical components 42 of the heat pump are located at the base 44 of the system 2 and include a pump.

Figure 3:
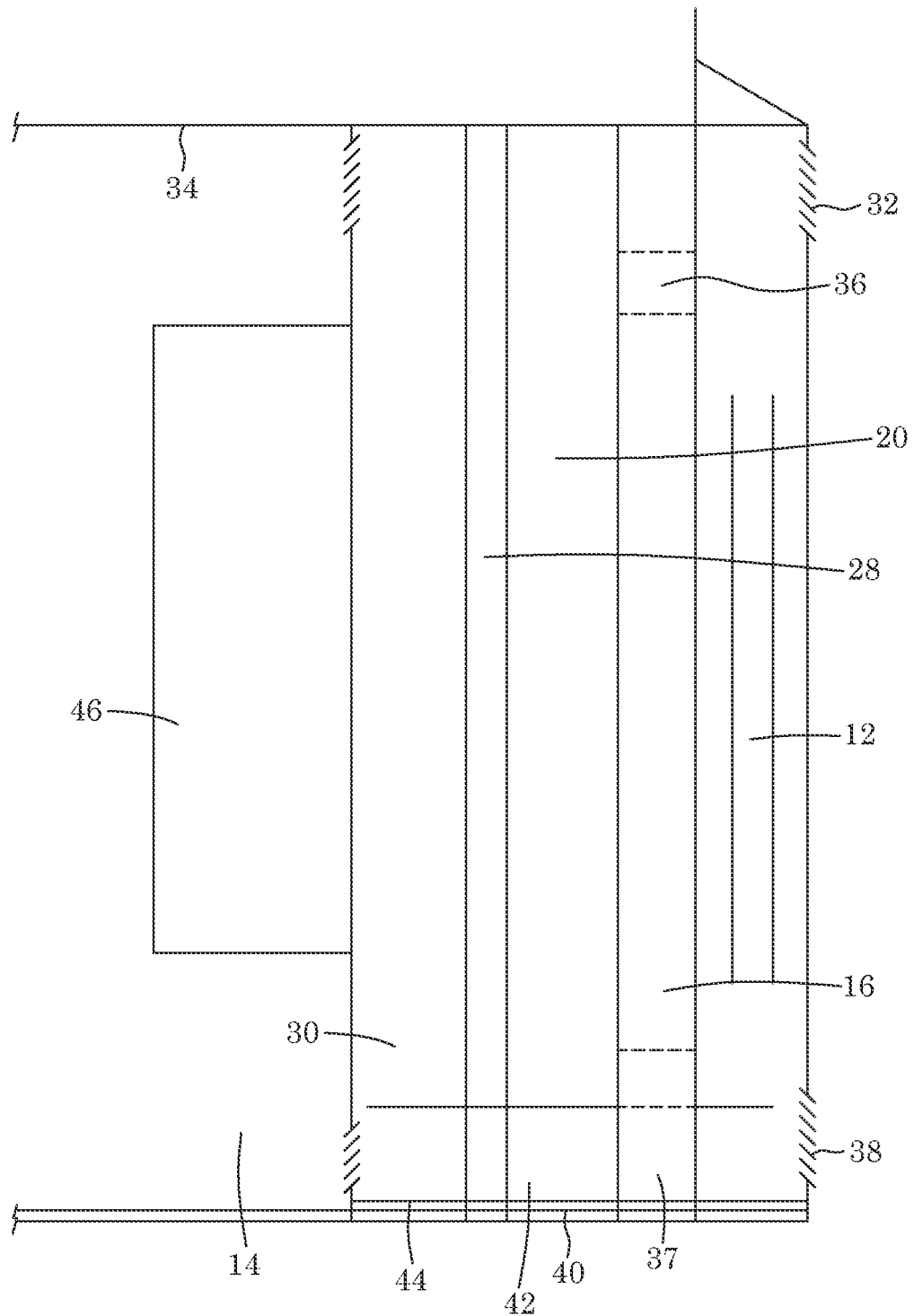
FIG. 3 is a side sectional view of an alternative embodiment of the integrated heat pump energy recovery ventilator system.

In another embodiment shown in FIG. 3, the heat pump condenser plate 12 forms the exterior layer. From the exterior to the interior, generally referred to as 14, a condenser plate VIP 16 is interior to the heat pump condenser plate 12, then an outer energy recovery ventilator core 20, which includes a plurality of plates, a heat pump evaporator plate 28, an inner heat pump energy recovery ventilator core 30, which includes a plurality of plates and a heater 46 such as a hybrid furnace, furnace, or fireplace. Ventilation is shared between the heater 46 and the integrated heat pump energy recovery ventilator unit 6. There is venting 36 through the VIP 16. A discharge duct 32 is located proximate to the ceiling. An intake duct 38 is proximate to the floor 40. The mechanical components 42 are located at the base 44 of the unit 6.

Figure 4:
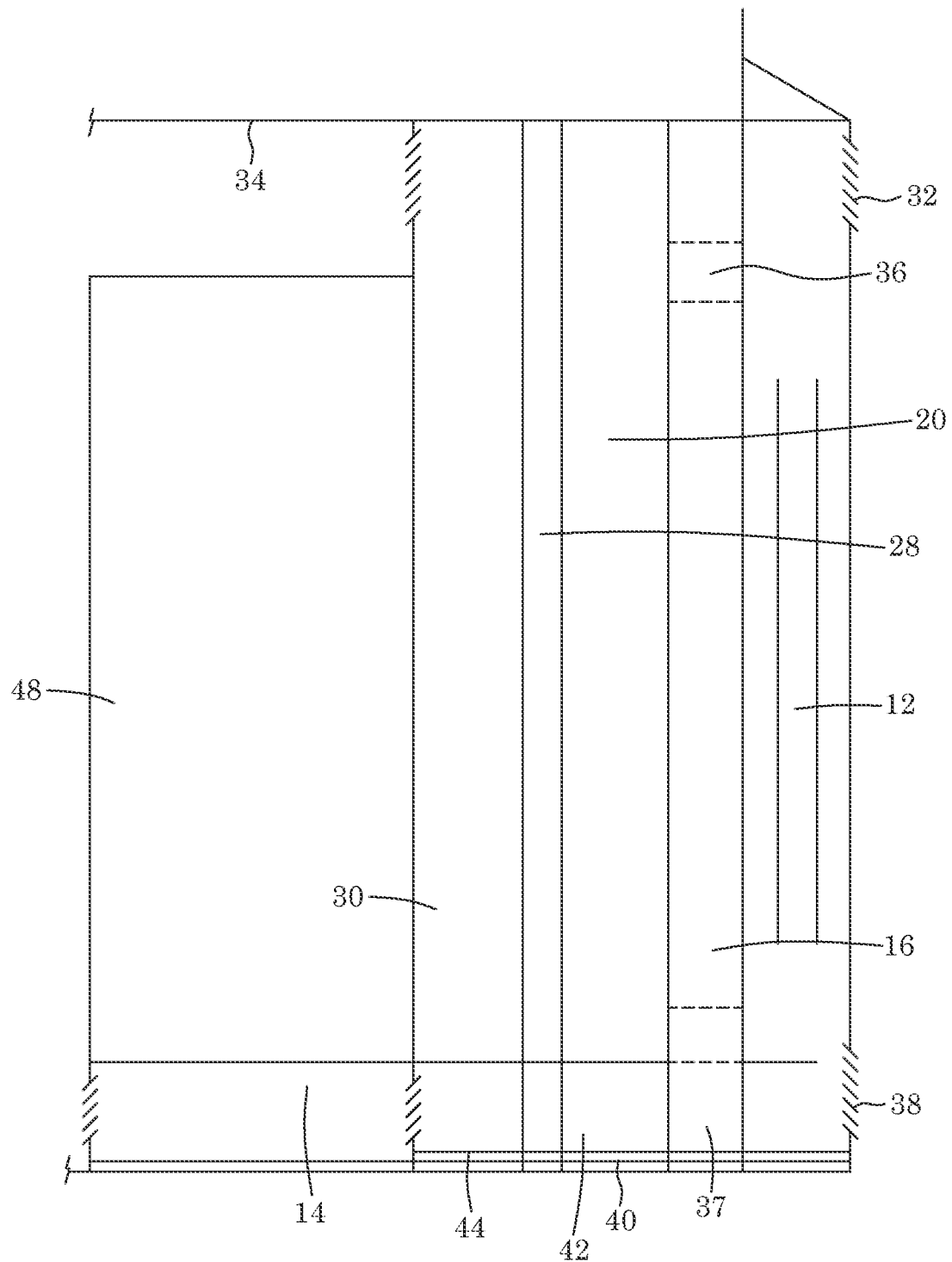
FIG. 4 is a side sectional view of an alternative embodiment of the integrated heat pump energy recovery ventilator system.

In another embodiment shown in FIG. 4, the heat pump condenser plate 12 forms the exterior layer. From the exterior to the interior, generally referred to as 14, a condenser plate VIP 16 is interior to the heat pump condenser plate 12, then an outer heat pump energy recovery ventilator core 20, which includes a plurality of plates, an evaporator plate 28, an inner heat pump energy recovery ventilator core 30, which includes a plurality of plates, and a refrigerator freezer 48. There is ducting 36 through the VIP 16. A discharge duct 32 is located proximate to the ceiling 34. An intake duct 38 is proximate to the floor 40. The mechanical components 42 are located at the base 44 of the unit 10.

Figure 5:
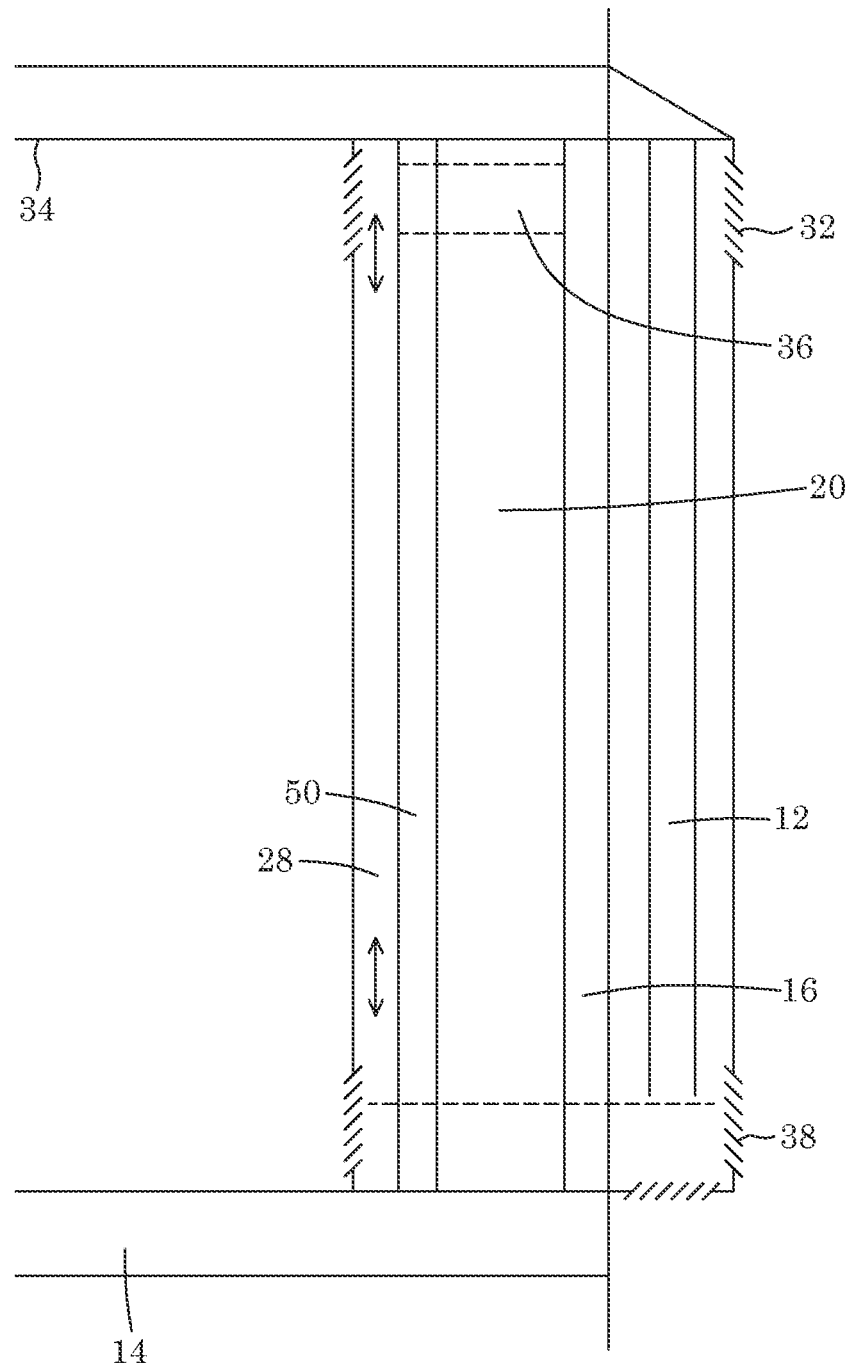
FIG. 5 is a side sectional view of an alternative embodiment of the integrated heat pump energy recovery ventilator system.

In another embodiment shown in FIG. 5, the heat pump condenser plate 12 forms the exterior layer. From the exterior to the interior, generally referred to as 14, the condenser plate VIP 16 is interior to the heat pump condenser plate 12, then an energy recovery ventilator 20, which includes a plurality of plates, an evaporator plate insulation panel, which is preferably a VIP 50, and a heat pump evaporator plate 28. There is ducting 36 through the VIP 16. A discharge duct 32 is located proximate to the ceiling 34. An intake duct 38 is proximate to the floor 40 The mechanical components 42 of the heat pump are located at the base 44 of the unit 6.

Figure 6:
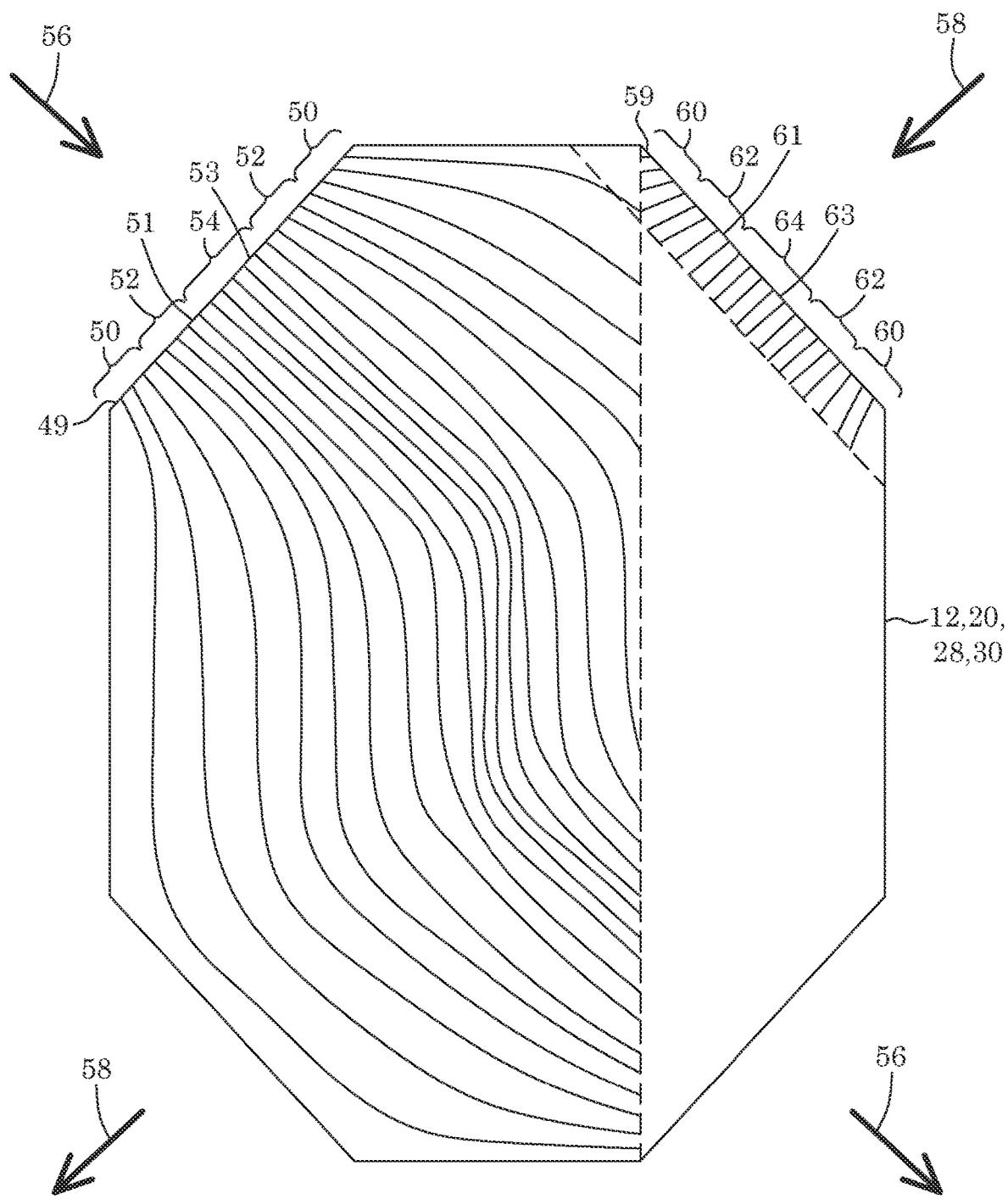
FIG. 6 is a top sectional view of a heat exchanger plate.

As shown in FIG. 6, the heat pump condenser plate 12, the outer heat pump energy recovery ventilator core 20, the evaporator plate 28 and the inner heat pump energy recovery ventilator core 30 all have a series of channels. In the embodiment shown, the channels are all curved. The opening 49 to the bore of each outer channel 50 is wide, the opening 51 to the bore of each middle channel 52 is an intermediate diameter and the opening 53 to the bore of each inner channel 54 is narrow. This promotes cold air flow through all the channels rather than concentrating the cold air flow in the inner channels, as normally occurs. It can be seen that the cold air flow 56 is normal to the warm air flow 58. The opening 59 to the bore of each outer channel 60 is wide, the opening 61 to the bore of each middle channel 62 is an intermediate diameter and the opening 63 to the bore of each inner channel 64 is narrow, relative to one another. This promotes warm air flow through all the channels rather than concentrating the warm air flow in the inner channels, as normally occurs. This plate design creates a condition where the opening to each of the channel has the same resistance to air flow. This is important as the outer channels 50, 60 are longer than the middle channels 52, 62 and the inner channels 54, 64 and the middle channels 52, 62 are longer than the inner channels 54, 64, so by varying the diameter of the openings, all the channels have air flowing through them, rather than just the shorter inner channels 54, 64 getting the most air flow and heat exchange.

Figure 7:
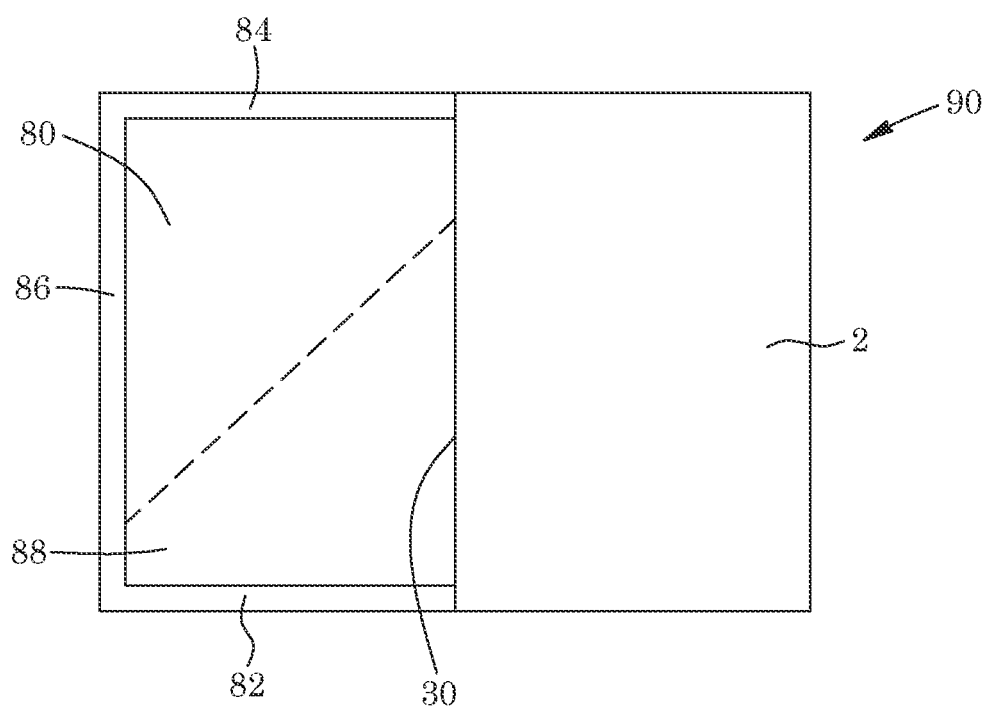
FIG. 7 is a side sectional view of the integrated heat pump energy recovery ventilator system and a cold room or refrigerator.

As shown in FIG. 7, in one embodiment, a box 80 is located on the inner side of the integrated heat pump energy recovery ventilator unit 2. The back of the box 80 is the inner heat pump energy recovery ventilator core 30. The floor 82, the ceiling 84, the front 86 and the sides 88 are all insulated. A refrigeration unit is housed in the cold room or refrigerator. In this manner, the integrated heat pump energy recovery ventilator system 2 and box 80 function as a refrigerator or cold room, generally referred to as 90.

Figure 8:
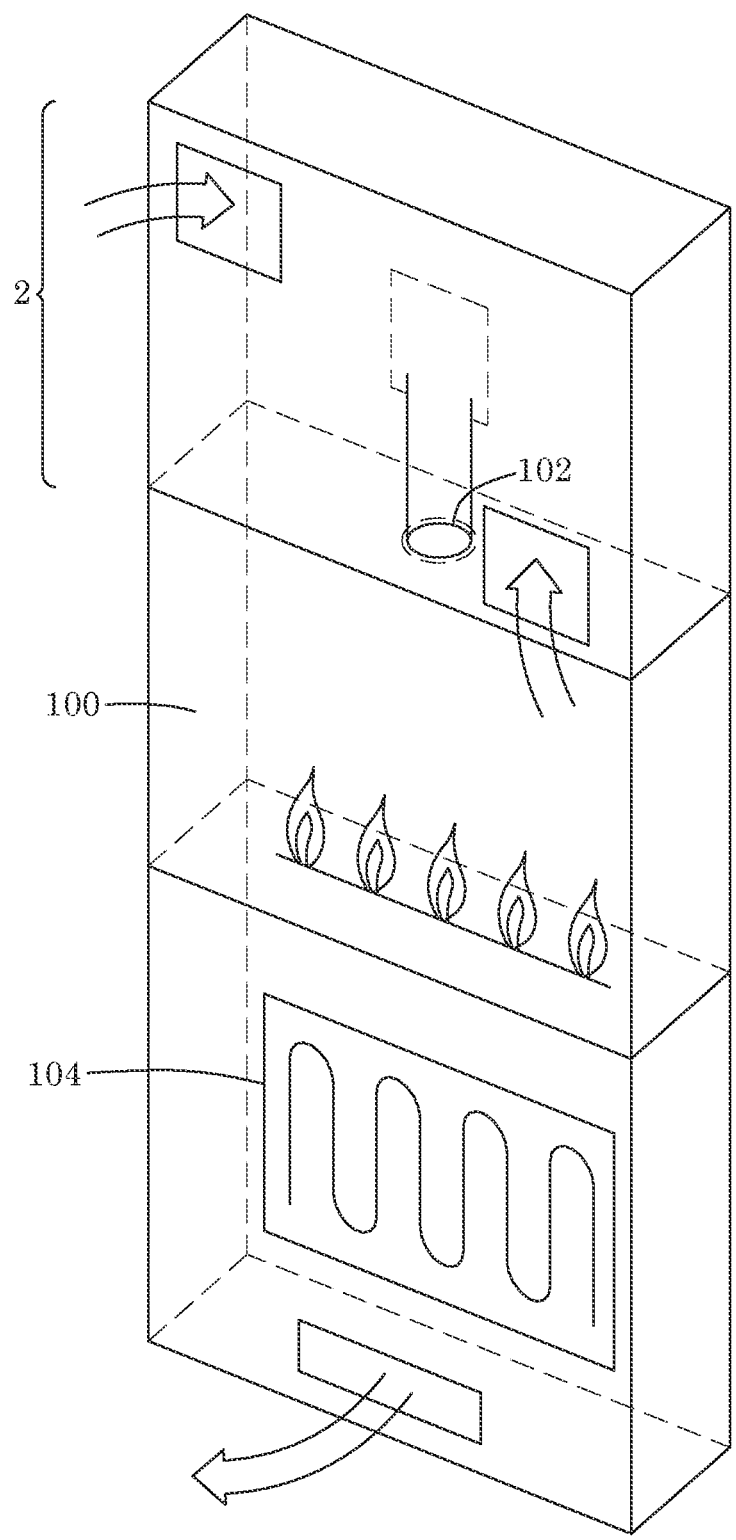
FIG. 8 is a perspective view of a fireplace and the integrated heat pump energy recovery ventilator system.

As shown in FIG. 8, the integrated heat pump energy recovery ventilator system 2 is integrated into a ventless gas heater 100, such as a gas fireplace or gas furnace, to improve air quality of the dwelling while not sacrificing the aesthetics. The gas heater 100 has an exhaust vent 102 which exhausts into the integrated heat pump energy recovery ventilator unit 6. Below the gas heater 100 is an electric element or evaporator coil 104.

Figure 9:
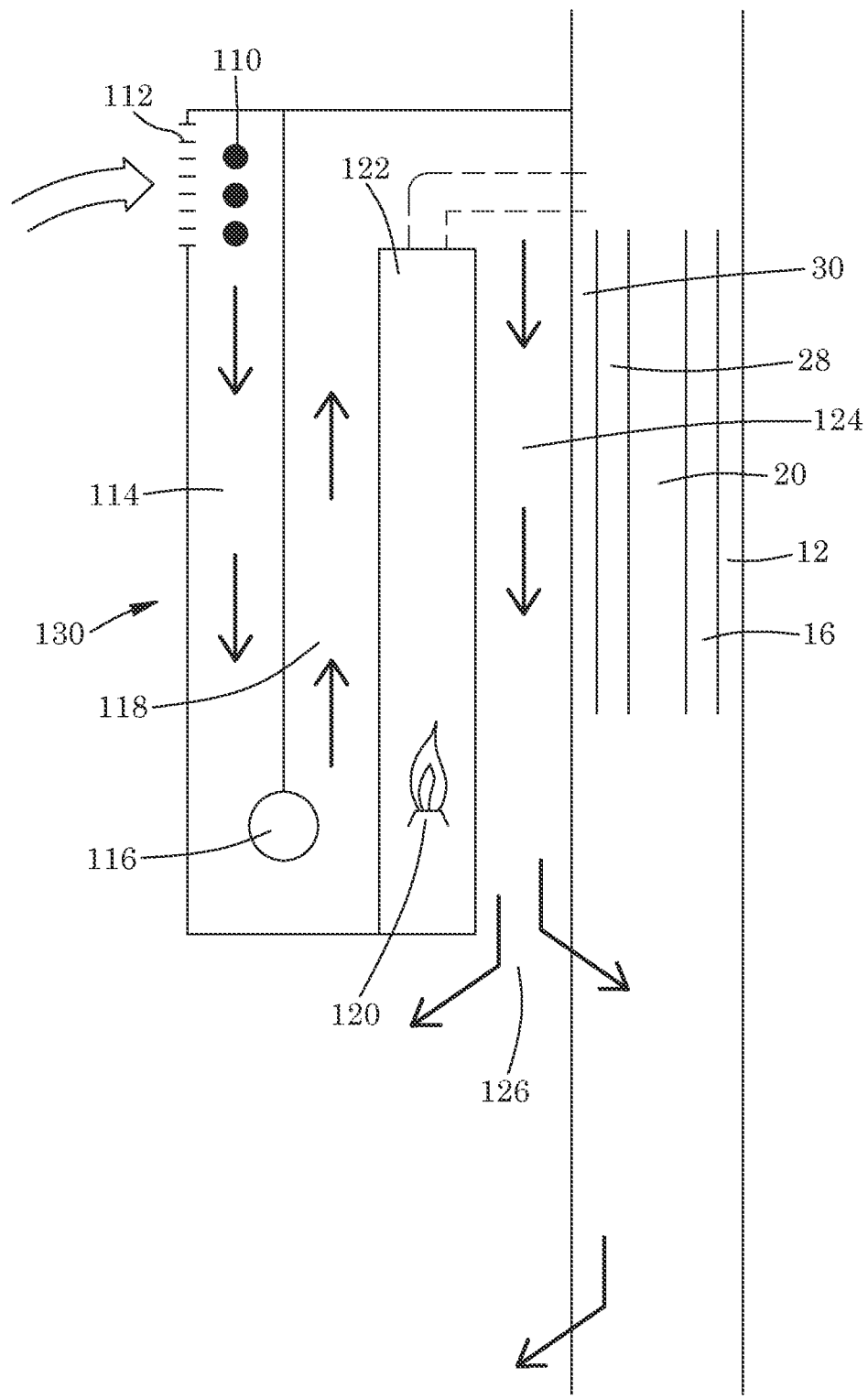
FIG. 9 is a side sectional view of the integrated heat pump energy recovery ventilator system, and a fireplace.

As shown in FIG. 9, infrared elements 110 are located at the room air intake 112. The air passes through a first interstitial space 114 and is drawn down with a fan 116 and is then warmed in the second interstitial space 118 by the flame from the burner 120 in the combustion chamber 122, then enters the third interstitial space 124 and exits through a room air return 126 of the fireplace, generally referred to as 130. In an alternative embodiment, the infrared elements 110 are located at the back of the combustion chamber 122. In another alternative embodiment the infrared elements 110 are parallel to the burner 120.

Figure 10:
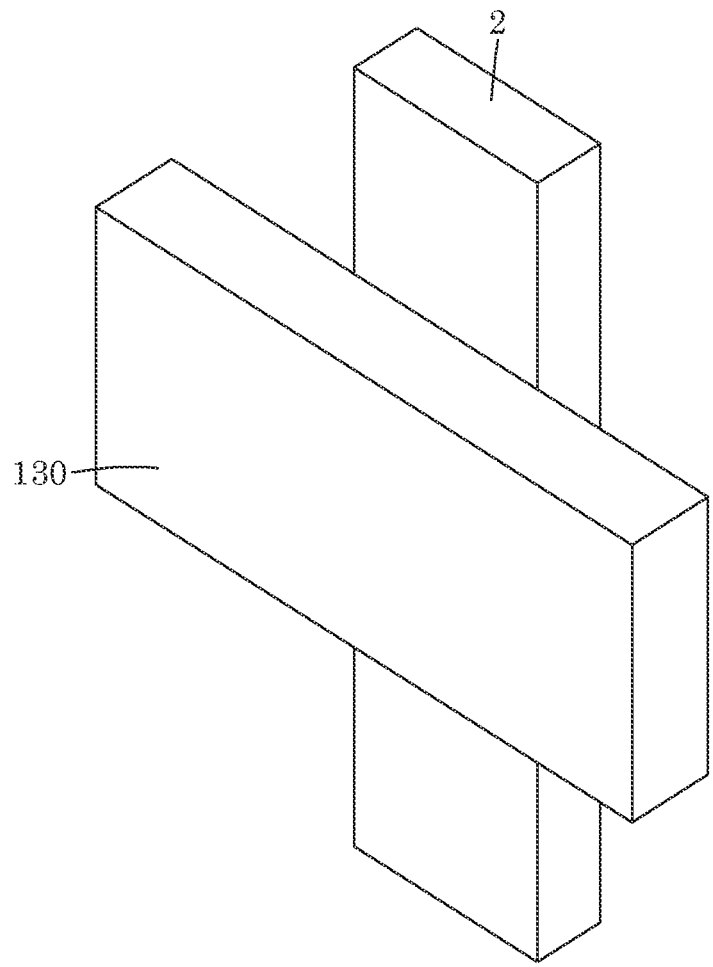
FIG. 10 is a perspective view of an alternative embodiment of the integrated heat pump energy recovery ventilator system and the fireplace.

As shown in FIG. 10, the fireplace 130 can be any shape and size as it sits within the room and is not housed in the stud cavity 8. The integrated heat pump energy recovery ventilator system 2 is housed in the stud cavity 8.

In all embodiments, the integrated heat pump energy recovery ventilator system 2 can include one or more of an air filter, a heat pump evaporator, disinfecting light (ultraviolet light), an electrostatic filter, a water based air filtration system, additional electric elements, a fuel cell to generate heat and electricity using hydrogen, a solid oxide fuel cell using natural gas or methanol and photovoltaics.

Figure 11:
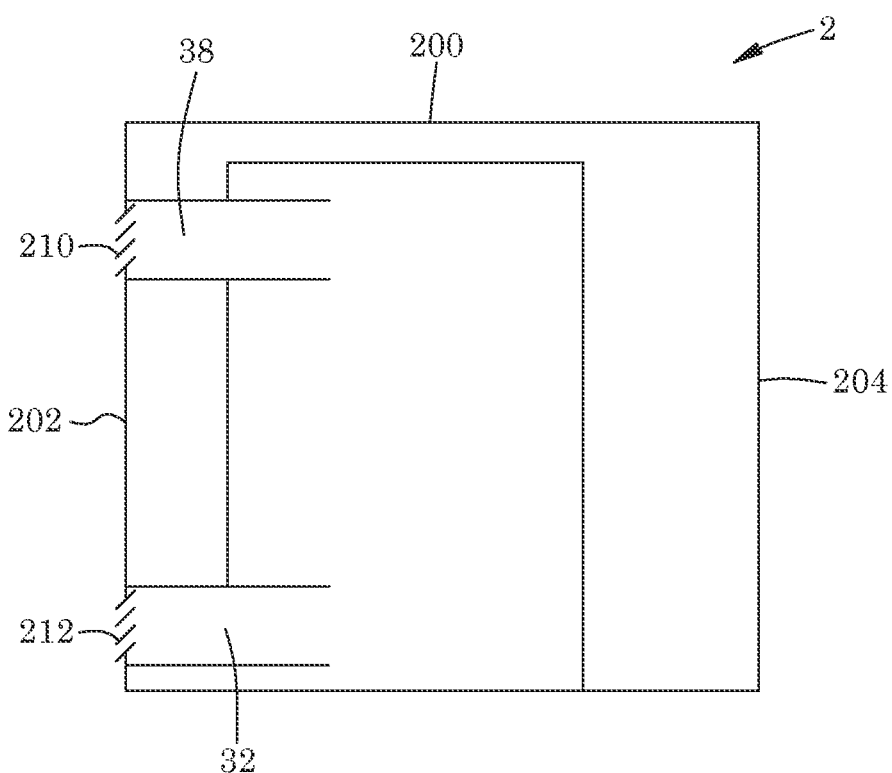
FIG. 11 is a side view of the integrated heat pump energy recovery ventilator system, including the housing.

As shown in FIG. 11, in all embodiments, the integrated heat pump energy recovery ventilator system 2 may include a housing 200. In one embodiment, the heat pump condenser plate 12 forms the front 202. In one embodiment, the inner heat pump energy recovery ventilator core 30 forms the back 204 of the housing 200. In another embodiment, the front 202 is an additional and separate layer to the heat pump condenser plate 12 and is outside of the heat pump condenser plate 12. In another embodiment, the back 204 is an additional and separate layer to the inner heat pump energy recovery ventilator core 30. The housing in every embodiment includes an intake vent 210 and exhaust vent 212, which are in fluid communication with the air intake duct 38 and the air discharge duct 32, respectively. The vents 210, 212 are located on the front 202.

Figure 12A:
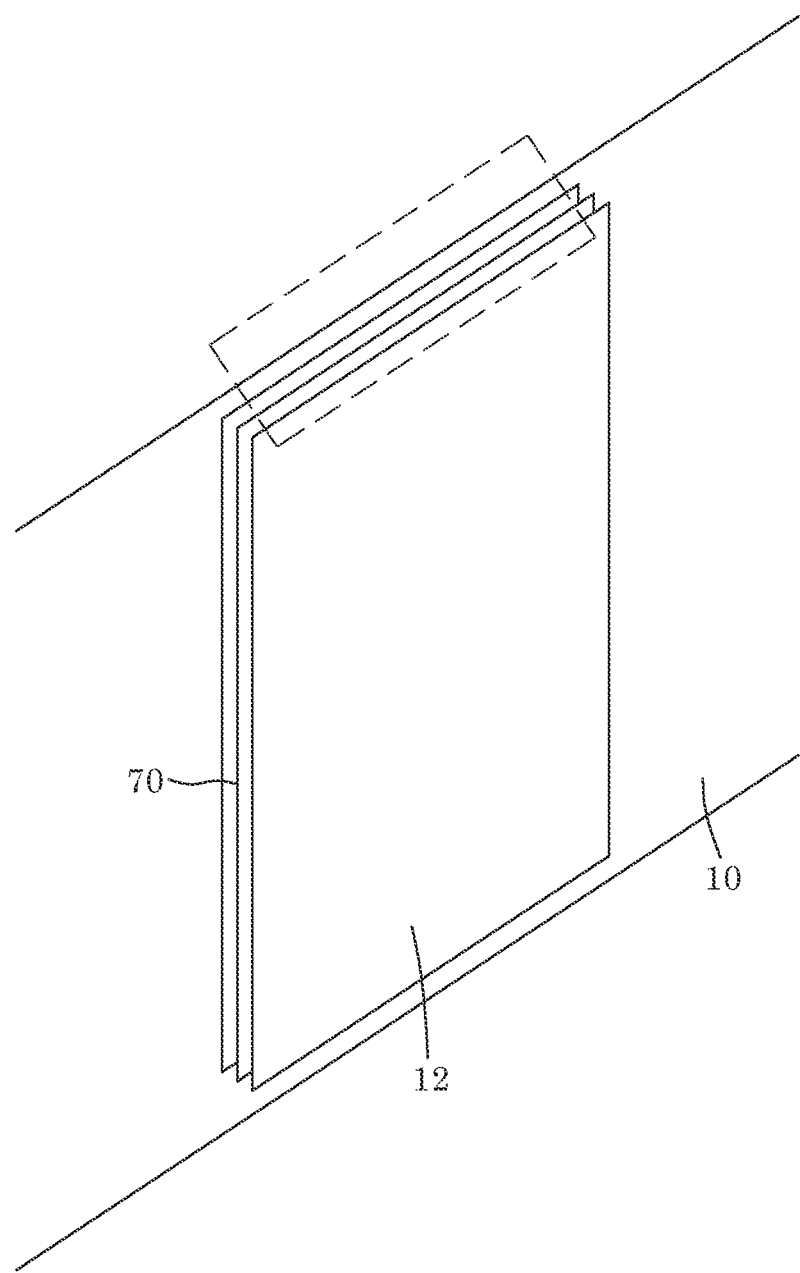
FIG. 12A to 12G show a range of possible exterior vent patterns.
Figure 12B:
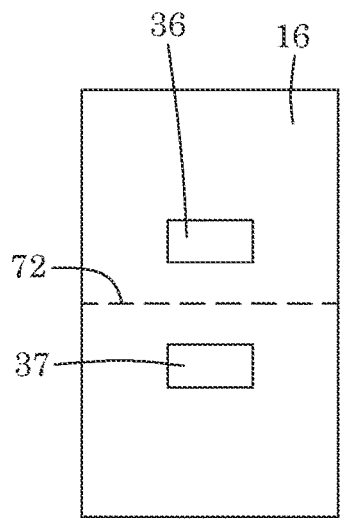
Figure 12C:
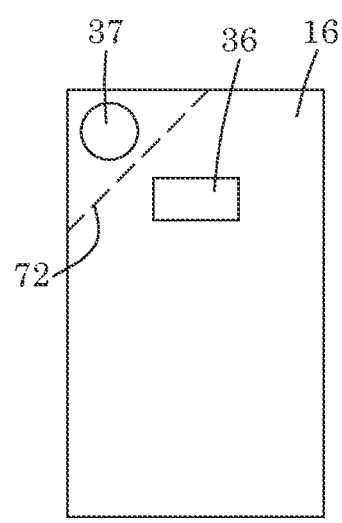
Figure 12D:
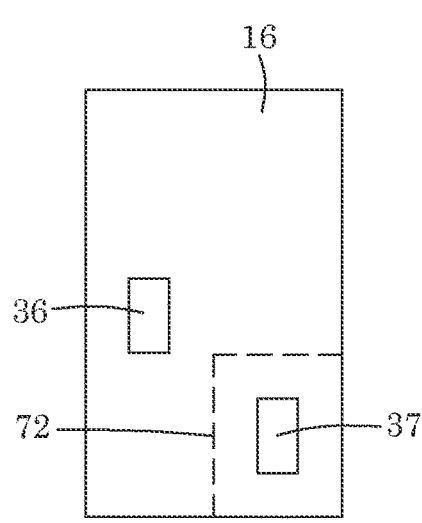
Figure 12E:
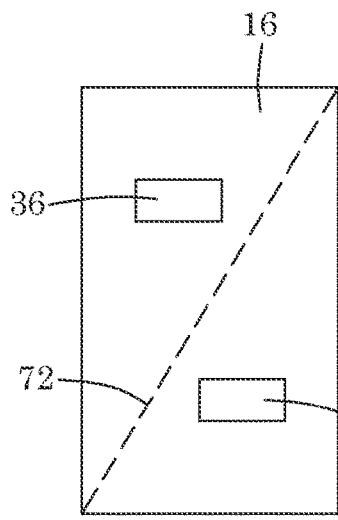
Figure 12F:
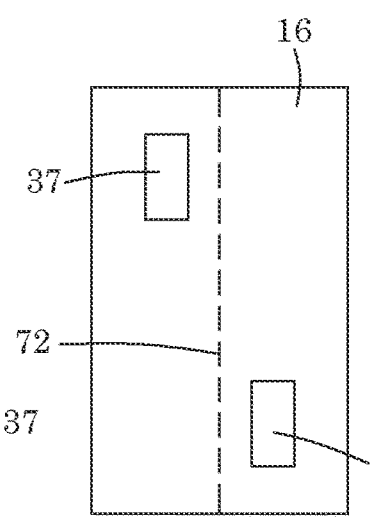
Figure 12G:
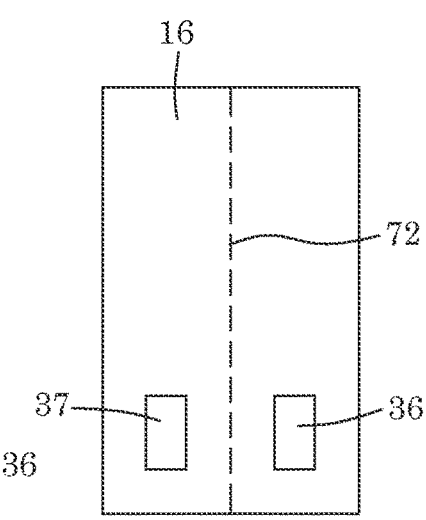

As shown in FIG. 12A, there is venting 220 around the sides of the outer surface 202. There are a range of other possible vent patterns, as shown in FIGS. 12B-12G. In all the vent patterns, there is a divider 222 between the air discharge vent 212 and the air intake vent 210. As would be known to one skilled in the art, the housing 200 preferably includes a top, a bottom and sides in addition to the front 202 and the back 204.

As shown in FIG. 13, in an alternative embodiment, the heat pump compressor 224 and the heat pump condenser plate 12 are on the exterior 212 of the building and the remainder of the system 2 is retained in the chase 8 of the building.

As shown in FIG. 14, in an alternative embodiment, the ventless heater 100 is located within an interior 14 of a building. A carbon monoxide detector 300 is in wired or wireless communication with a switch 302 of the controller 304 of the integrated heat pump energy recovery ventilator system 2 and the switch 306 for the controller 308 of the ventless heater 100. These together form the carbon monoxide control system. The controllers 304 and 308 ensure that the ventless heater 100 and the integrated heat pump energy recovery ventilator system 2 are functioning at a high efficiency, while being switched on and off as needed in response to the carbon monoxide concentration in the air. In one embodiment the heat pump compressor 224 and the heat pump condenser plate 12 may be on the exterior 212 of the building and the remainder of the system 2 may be retained in the chase 8 of the building. In another embodiment, the entire system 2 may be in the chase 8 of the building. In one embodiment, the ventless heater is a ventless gas stove or ventless gas oven for cooking. In one embodiment, the ventless heater 100 exhaust directly into the integrated heat pump energy recovery ventilator system 2 and in another embodiment, it vents directly into the room.

In another embodiment, the ventless heater 100 is in fluid communication with the energy recovery ventilator 3. In one embodiment, the ventless heater 100 exhaust directly into the energy recovery ventilator 3 and in another embodiment, it vents directly into the room.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. An integrated heat pump energy recovery ventilator system for installing in a chase of a wall, the integrated heat pump energy recovery ventilator system comprising:
    a heat pump which includes: an air intake duct; a pump in fluid communication with the air intake duct; a heat pump condenser plate in fluid communication with the pump; a heat pump evaporator plate; and an air outlet duct;
    an energy recovery ventilator which includes: an outer energy recovery ventilator core; and an inner energy recovery ventilator core wherein the heat pump evaporator plate is between the outer energy recovery ventilator core and the inner energy recovery ventilator core;
    an outer insulation panel between the heat pump condenser plate and the outer energy recovery ventilator core;
    and a housing, the housing including a front and a back, the housing retaining the heat pump, the energy recovery ventilator and the outer insulation panel.

2. The integrated heat pump energy recovery ventilator system of claim 1, wherein the heat pump condenser plate, the outer heat pump energy recovery ventilator core, the evaporator plate and the inner heat pump energy recovery ventilator core all include at least a first series of channels and a second series of channels, the second series of channels disposed normal to the first series of channels, each series of channels including innermost channels which define a bore and a narrow diameter opening to the bore, outermost channels which define a bore and a wide diameter opening to the bore and channels between the innermost channels and the outermost channels that define a bore and an intermediate diameter opening to the bore.

3. The integrated heat pump energy recovery ventilator system of claim 2, further comprising an inner insulation panel between the heat pump evaporator plate and the inner energy recovery ventilator core.

4. The integrated heat pump energy recovery ventilator system of claim 3, wherein the first series of channels and the second series of channels are curved.

5. An installation comprising:
    the integrated heat pump energy recovery ventilator system of claim 1, further comprising an air intake duct, an air outlet duct, a pump in fluid communication with the air intake duct; and
    a cold room, the cold room defined by the inner energy recovery core, a front, a top, a bottom and sides, the cold room including a refrigeration unit.

6. The installation of claim 5, wherein the heat pump condenser plate, the outer heat pump energy recovery ventilator core, the evaporator plate and the inner heat pump energy recovery ventilator core all include at least a first series of channels and a second series of channels, the second series of channels disposed normal to the first series of channels, each series of channels including innermost channels which define a bore and a narrow diameter opening to the bore, outermost channels which define a bore and a wide diameter opening to the bore and channels between the innermost channels and the outermost channels that define a bore and an intermediate diameter opening to the bore.

7. A heater comprising a heating unit and an integrated heat pump energy recovery ventilator system the integrated heat pump energy recovery ventilator system in fluid communication with the heating unit and comprising:
    a heat pump which includes: an air intake duct; a pump in fluid communication with the air intake duct; a heat pump condenser plate in fluid communication with the pump; a heat pump evaporator plate; and an air outlet duct;
    an energy recovery ventilator which includes: an outer energy recovery ventilator core; and an inner energy recovery ventilator core wherein the heat pump evaporator plate is between the outer energy recovery ventilator core and the inner energy recovery ventilator core;
    an outer insulation panel between the heat pump condenser plate and the outer energy recovery ventilator core;
    and a housing, the housing including a front and a back, the housing retaining the heat pump, the energy recovery ventilator and the outer insulation panel.

8. The heater of claim 7, wherein the heat pump condenser plate, the outer heat pump energy recovery ventilator core, the evaporator plate and the inner heat pump energy recovery ventilator core all include at least a first series of channels and a second series of channels, the second series of channels disposed normal to the first series of channels, each series of channels including innermost channels which define a bore and a narrow diameter opening to the bore, outermost channels which define a bore and a wide diameter opening to the bore and channels between the innermost channels and the outermost channels that define a bore and an intermediate diameter opening to the bore.

9. The combination of claim 7, wherein the heating unit is a gas fireplace.

10. The combination of claim 9, wherein the gas fireplace includes at least one infrared element.

11. The combination of claim 10, further comprising an air filtration system which is in fluid communication with the gas fireplace and the integrated heat pump energy recovery ventilator system.

12. The combination of claim 11 wherein the heater includes an exhaust duct which exhausts into the integrated heat pump energy recovery ventilator system.

* * * * *

UNITED STATES PATENT AND TRADEMARK OFFICE
CERTIFICATE OF CORRECTION

| | | |
|---|---|---|
| PATENT NO. | : 11,933,505 B2 | Page 1 of 1 |
| APPLICATION NO. | : 18/154744 | |
| DATED | : March 19, 2024 | |
| INVENTOR(S) | : Walter Wardrop et al. | |

It is certified that error appears in the above-identified patent and that said Letters Patent is hereby corrected as shown below:

On the Title Page

Please insert the following:
--(30) Foreign Application Priority Data
January 14, 2022 (CA)........................CA 3145720--

Signed and Sealed this
Thirtieth Day of April, 2024

Katherine Kelly Vidal
*Director of the United States Patent and Trademark Office*